United States Patent
Lin et al.

(10) Patent No.: US 12,181,672 B2
(45) Date of Patent: Dec. 31, 2024

(54) EYELENS WAVEGUIDE

(71) Applicant: Snap Inc., Santa Monica, CA (US)

(72) Inventors: Jun Lin, Sherman Oaks, CA (US); Zhibin Zhang, Venice, CA (US)

(73) Assignee: Snap Inc., Santa Monica, CA (US)

( * ) Notice: Subject to any disclaimer, the term of this patent is extended or adjusted under 35 U.S.C. 154(b) by 775 days.

(21) Appl. No.: 17/352,140

(22) Filed: Jun. 18, 2021

(65) Prior Publication Data
US 2021/0311318 A1    Oct. 7, 2021

Related U.S. Application Data

(63) Continuation of application No. 15/913,149, filed on Mar. 6, 2018, now Pat. No. 11,054,647.

(51) Int. Cl.
*G02B 6/34* (2006.01)
*F21V 8/00* (2006.01)
*G02B 27/01* (2006.01)

(52) U.S. Cl.
CPC ....... *G02B 27/0172* (2013.01); *G02B 6/0016* (2013.01); *G02B 6/0038* (2013.01); *G02B 6/0088* (2013.01); *G02B 27/0176* (2013.01); *G02B 2027/0125* (2013.01); *G02B 2027/0138* (2013.01); *G02B 2027/0154* (2013.01); *G02B 2027/0178* (2013.01)

(58) Field of Classification Search
None
See application file for complete search history.

(56) References Cited

U.S. PATENT DOCUMENTS

| | | |
|---|---|---|
| 4,799,750 A | 1/1989 | Miyawaki |
| 4,929,042 A | 5/1990 | Hatori et al. |
| 4,961,632 A | 10/1990 | Hatori et al. |
| 5,315,676 A | 5/1994 | Sunagawa |
| 5,835,643 A | 11/1998 | Fukumoto et al. |
| 8,760,762 B1 | 6/2014 | Kelly et al. |
| 8,876,285 B2 | 11/2014 | Jannard |
| 9,651,368 B2 | 5/2017 | Abovitz et al. |
| 2005/0174651 A1 | 8/2005 | Spitzer et al. |
| 2014/0098424 A1 | 4/2014 | Jannard |
| 2015/0086163 A1 | 3/2015 | Valera et al. |
| 2018/0149791 A1 | 5/2018 | Urness et al. |

(Continued)

OTHER PUBLICATIONS

U.S. Appl. No. 15/913,149 U.S. Pat. No. 11,054,647, Mar. 6, 2018, Eyelens Waveguide.

(Continued)

*Primary Examiner* — Balram T Parbadia
(74) *Attorney, Agent, or Firm* — Schwegman Lundberg & Woessner, P.A.

(57) ABSTRACT

Various waveguides and image display systems are disclosed herein. In an example, an image display system can include an optical engine configured to generate an image and a waveguide. The waveguide can have a light in-coupling region formed along a peripheral edge of the waveguide, the light in-coupling region including a first surface with a first set of diffraction gratings, and a light exit region formed along a top surface of the waveguide, the light exit region including a second set of diffraction gratings. The first set of diffraction gratings can be configured to diffract light towards the second set of diffraction gratings, and the second set of diffraction gratings can be configured to diffract light towards the user's eye.

20 Claims, 7 Drawing Sheets

(56) References Cited

U.S. PATENT DOCUMENTS

2018/0172995 A1     6/2018   Lee et al.
2019/0011625 A1     1/2019   Wang et al.

OTHER PUBLICATIONS

"U.S. Appl. No. 15/913,149, Advisory Action mailed Sep. 28, 2020", 3 pgs.

"U.S. Appl. No. 15/913,149, Examiner Interview Summary mailed Feb. 26, 2021", 2 pgs.

"U.S. Appl. No. 15/913,149, Final Office Action mailed Jul. 14, 2020", 14 pgs.

"U.S. Appl. No. 15/913,149, Non Final Office Action mailed Feb. 5, 2020", 14 pgs.

"U.S. Appl. No. 15/913,149, Non Final Office Action mailed Nov. 23, 2020", 10 pgs.

"U.S. Appl. No. 15/913,149, Notice of Allowance mailed Mar. 3, 2021", 8 pgs.

"U.S. Appl. No. 15/913,149, Response filed Feb. 23, 2021 to Non Final Office Action mailed Nov. 23, 2020", 10 pgs.

"U.S. Appl. No. 15/913,149, Response filed May 5, 2020 to Non Final Office Action mailed Feb. 5, 2020", 10 pgs.

"U.S. Appl. No. 15/913,149, Response filed Sep. 14, 2020 to Final Office Action mailed Jul. 14, 2020", 13 pgs.

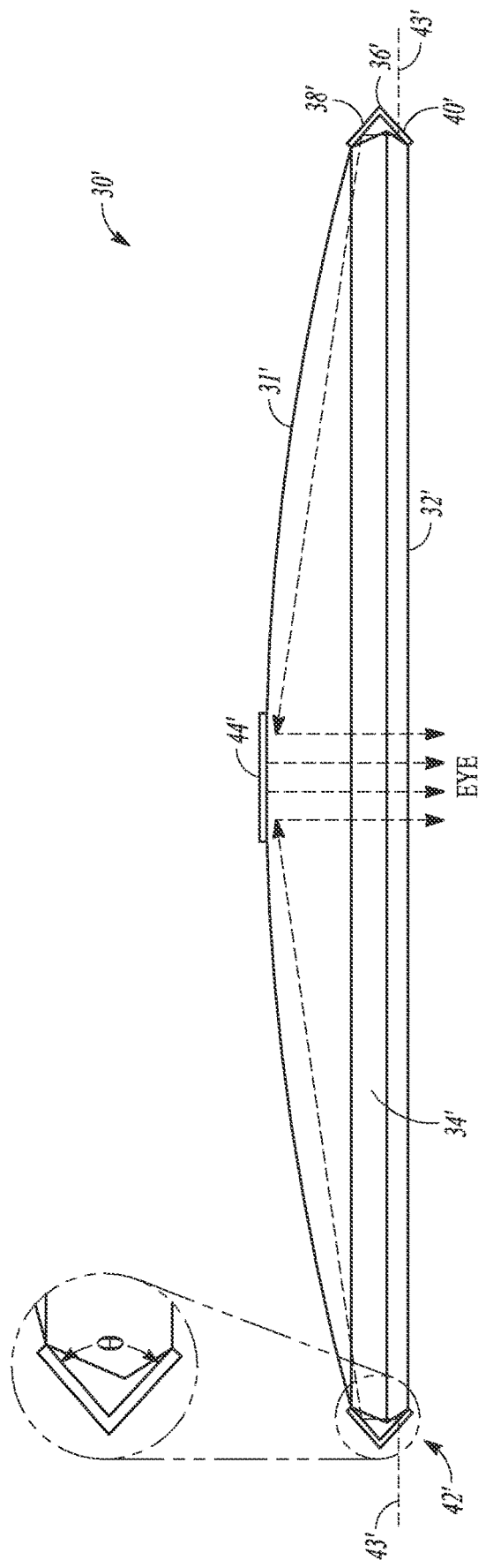

EYELENS WAVEGUIDE

CROSS-REFERENCE TO RELATED APPLICATION

This application is a continuation of U.S. patent application Ser. No. 15/913,149, filed Mar. 6, 2018, which is incorporated by reference herein in its entirety.

BACKGROUND

A waveguide is a type of optical combiner. In effect, a combiner works like a partial mirror. It reflects or redirects display light to the eye while letting light through from the real world. Stated differently, a waveguide is a structure that guides waves, such as electromagnetic waves or sound, with minimal loss of energy by restricting expansion to one (1) dimension or two (2). Without the physical constraint of a waveguide, waves decrease according to the inverse square law as they expand into three-dimensional (3D) space. A waveguide can confine the wave to propagate in one (1) dimension, so that, under ideal conditions, the wave loses no power while propagating. Due to total reflection at the walls of a waveguide (e.g., total internal reflection (TIR)), waves are confined to the interior of the waveguide.

Waveguides can be used in a number of wearable display devices (e.g., a near-eye display (NED)). NEDs can display an image within a short distance from a human eye, sometimes an image that is overlaid onto a real-world view (e.g., as with augmented or mixed reality devices). Currently, however, waveguides used with NEDs and other display devices are typically bulky rectangular waveguides that are not suitable to a consumer's expectation for typical eyewear.

The present disclosure provides unique waveguides that improve upon existing waveguide concepts, as well as NEDs and other display systems that use such waveguides.

BRIEF DESCRIPTION OF THE FIGURES

The above-mentioned and other features and advantages of this disclosure, and the manner of attaining them, will become more apparent and the disclosure itself will be better understood by reference to the following description of examples taken in conjunction with the accompanying drawings, wherein:

FIG. 3B is a side view of a second waveguide that can be used with a NED system, such as the example of FIG. 2.

Corresponding reference characters indicate corresponding parts throughout the several views. The exemplifications set out herein illustrate examples of the disclosure, and such exemplifications are not to be construed as limiting the scope of the disclosure any manner.

DETAILED DESCRIPTION

In describing the examples of the disclosure illustrated and to be described with respect to the drawings, specific terminology will be used for the sake of clarity. However, the disclosure is not intended to be limited to any specific terms used herein, and it is to be understood that each specific term includes all technical equivalents.

The present disclosure is directed to unique waveguides and display systems that utilize such waveguides (e.g., NEDs and/or other wearable display systems). A display system as contemplated herein can comprise an image source, e.g., a projector or optical engine, a waveguide(s), and various optical elements (e.g., diffraction gratings) imprinted on the waveguide(s) surface to assist with redirecting light for projecting an image to a user. The display system can be a mixed-reality or augmented-reality display system.

Figure 1:
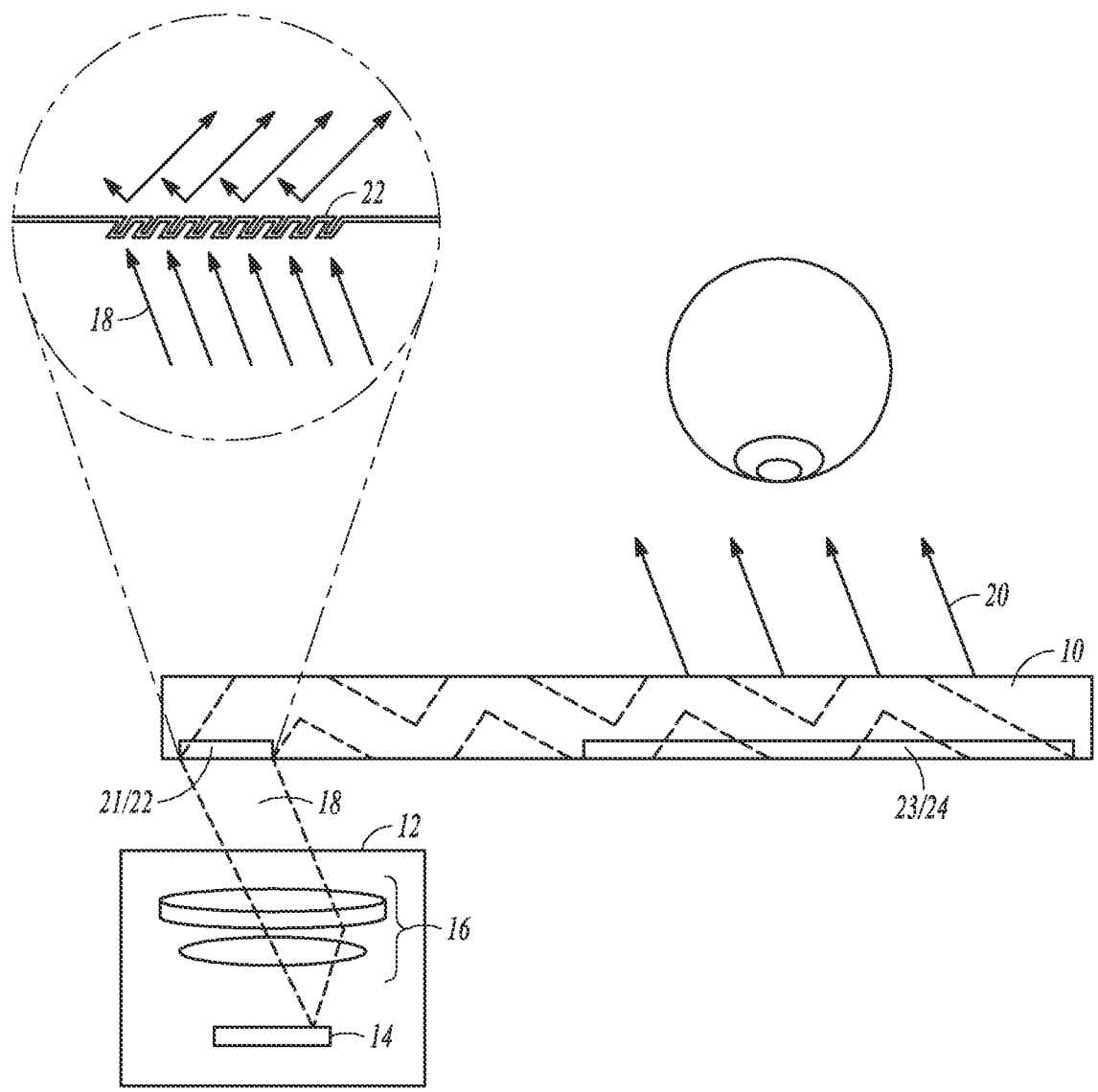
FIG. 1 is a top schematic view of part of a NED using a waveguide, according to an example of the disclosure.
Figure 2:
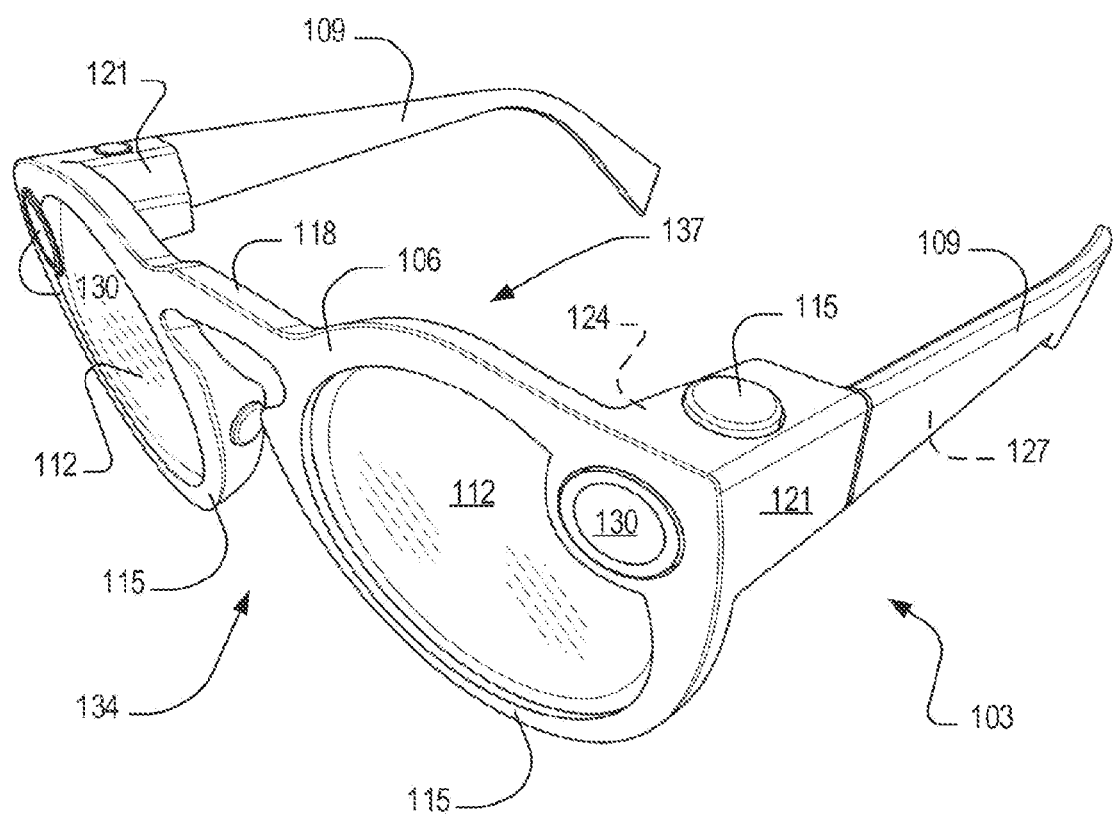
FIG. 2 is a perspective view of a NED system utilizing a waveguide, according to another example of the disclosure.

FIG. 1 depicts an example of part of a NED system. For instance, FIG. 1 can depict half of a NED, with the other half being a mirror image of FIG. 1. Combined together, both halves can form the NED, an example of which is shown in FIG. 2. As shown in FIG. 1, the NED part can include an optical component 10 (e.g., a waveguide) and an optical engine 12. Optical engine 12 can include a micro display 14 and imaging optics 16, which can be in the form of a collimator or collimating lens. Optical engine 12 can also include a processor(s) configured to generate an image for micro display 14. Micro display 14 can be any type of light or image source (e.g., a projector), including but not limited to a liquid crystal display (LCD), one or more light emitting diodes (LEDs) in the form of a display (LED display), a liquid crystal on silicon (LCoS) display or projector, or any other suitable display or projector. The display can be driven by circuitry, which is not shown in FIG. 1.

Waveguide 10 can include surface gratings 22, 24 that can redirect light entering waveguide 10 or exiting waveguide 10. As an example, waveguide 10 can include an in-coupling region 21 with surface gratings 22 and an exit region 23 with surface gratings 24. In-coupling region 21 can accept an incoming light beam(s) 18 and redirect light beam(s) 18 by way of surface gratings 22 so that beam(s) 18 is internally reflected inside of waveguide 10 towards exit region 23 and its surface gratings 24. As shown in FIG. 1, when light beam(s) 18 reaches exit region 23, surface gratings 24 can redirect light beam(s) 18 so that it exits waveguide 10 towards a user's eye as an exit light beam(s) 20.

Figure 4:
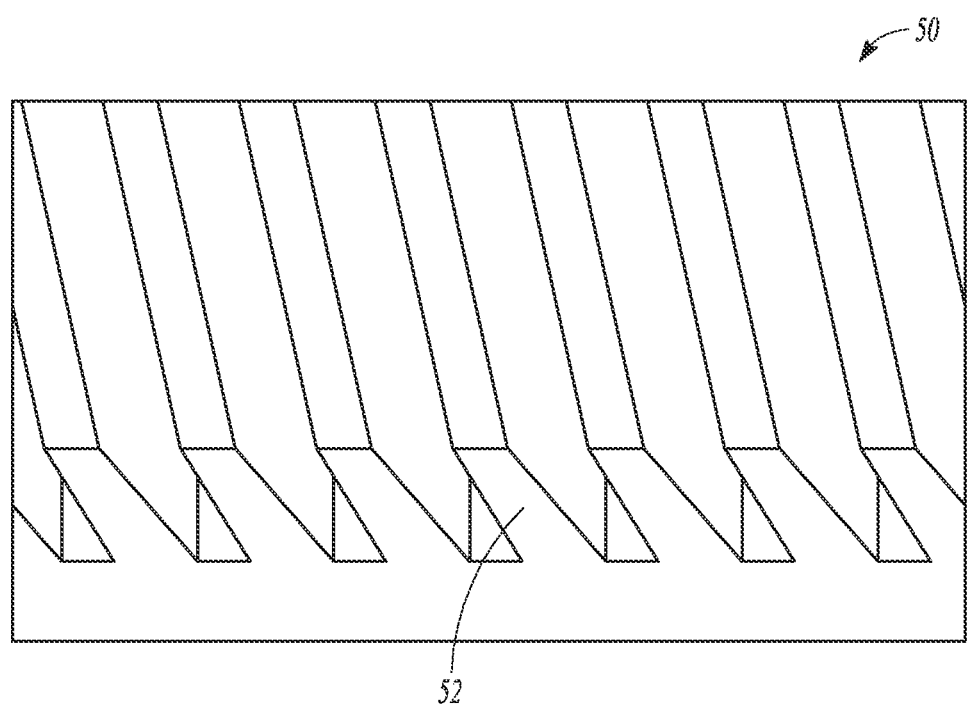
FIG. 4 is a close-up view of diffraction gratings, which can be used with the waveguides of the disclosure.

FIG. 1 also depicts a close-up of exemplary in-coupling surface gratings 22, which are shown further in FIG. 4 and described in more detail below. Due to the aforementioned redirection of light by surface gratings 22, 24, an image produced by optical engine 12 (e.g., micro display 14) can be projected towards a user's eye so that the NED can display projected images to the user. In an example, the projected images can be overlaid onto the real world, as is the case with augmented-reality or mixed-reality NEDs. Indeed, since waveguide 10 can be transparent, a user can simultaneously see any projected images and real-world images through waveguide 10.

Existing augmented-reality and mixed-reality NEDs frequently use a bulky rectangular-shaped waveguide as a display mechanism. Yet, such waveguides are not suited to consumer expectations of eyewear. As such, the present disclosure provides a curved waveguide, examples of which are shown in FIGS. 3A-D, that uses unique diffraction grating patterns to improve the form-factor and usability of the waveguide. The present disclosure also provides a NED that can incorporate any of the curved waveguides of the disclosure.

FIG. 2 illustrates a front perspective view of an eyewear device in the form of a pair of smart glasses 100, which can constitute a NED. NED 100 can include an integrated photo capture indication system, according to an example embodiment, and any of waveguides 10, 30, 30' of the disclosure (described in more detail below). NED 100 can include a body 103 comprising a front piece or frame 106 and a pair of temples 109 connected to frame 106 for supporting frame 106 in position on a user's face when NED 100 is worn. Frame 106 can be made from any suitable material such as plastics or metal, including any suitable shape-memory alloy.

NED 100 can have a pair of optical elements in the form of a pair of lenses 112 held by corresponding optical element holders in the form of a pair of rims 115 forming part of frame 106. Rims 115 of frame 106 can be connected by a bridge 118. In other embodiments, of one or both of the optical elements can be a display, a display assembly, or a lens and display combination. For instance, in an example, lenses 112 can incorporate any of waveguides 10, 30, 30' as a display mechanism, or lenses 112 can themselves be any of waveguides 10, 30, 30'.

Frame 106 can include a pair of end pieces 121 defining lateral end portions of frame 106. In this example, a variety of electronics components can be housed in one or both of end pieces 121, as discussed in more detail below. In an example, optical engine 12 can be disposed within one or both of end pieces 121.

Temples 109 can be coupled to the respective end pieces 121. In this example, temples 109 can be coupled to frame 106 by respective hinges so as to be hingedly movable between a wearable mode (as shown in FIG. 2) and a collapsed mode in which temples 109 are pivoted towards frame 106 to lie substantially flat against it. In other examples, temples 109 can be coupled to frame 106 by any suitable means, or can be rigidly or fixedly secured to frame 106 so as to be integral therewith. Each of temples 109 can include a front portion that is coupled to frame 106 and any suitable rear portion for coupling to the ear of the user.

NED 100 can have onboard electronics components including a computing device, such as a computer 124, which can in different embodiments be of any suitable type so as to be carried by body 103. In some examples, computer 124 can be at least partially housed in one or both of the temples 109. In the present example, various components of computer 124 can be housed in lateral end pieces 121 of frame 106. Computer 124 can include one or more processors with memory, wireless communication circuitry, and a power source. Computer 124 can comprise low-power circuitry, high-speed circuitry, and, in some embodiments, a display processor(s). Various examples can include these elements in different configurations or integrated together in different ways.

Computer 124 can additionally include a battery 127 or other suitable portable power supply. In an example, battery 127 can be disposed in one of temples 109. In NED 100 shown in FIG. 2, battery 127 is shown as being disposed in one of end pieces 121, being electrically coupled to the remainder of computer 124 housed in the corresponding end piece 121.

NED 100 can also be camera-enabled, in this example comprising a camera 130 mounted in one of end pieces 121 and facing forwards so as to be aligned more or less with the direction of view of a wearer of glasses 100. Camera 130 can be configured to capture digital images (also referred to herein as digital photographs or pictures), as well as digital video content. Operation of camera 130 can be controlled by a camera controller provided by computer 124, image data representative of images or video captured by the camera 130 being temporarily stored on a memory forming part of computer 124. In some examples, NED 100 can have a pair of cameras 130, e.g. housed by the respective end pieces 121. As described in more detail below, due to the construction of waveguides 10, 30, 30', NED 100 can have a form that is more suitable to traditional expectations of eyewear. Additionally, NED 100 can utilize any of waveguides 10, 30, 30', with their unique pattern of diffraction gratings, to project images to a user in a desirable fashion.

Figure 3A:
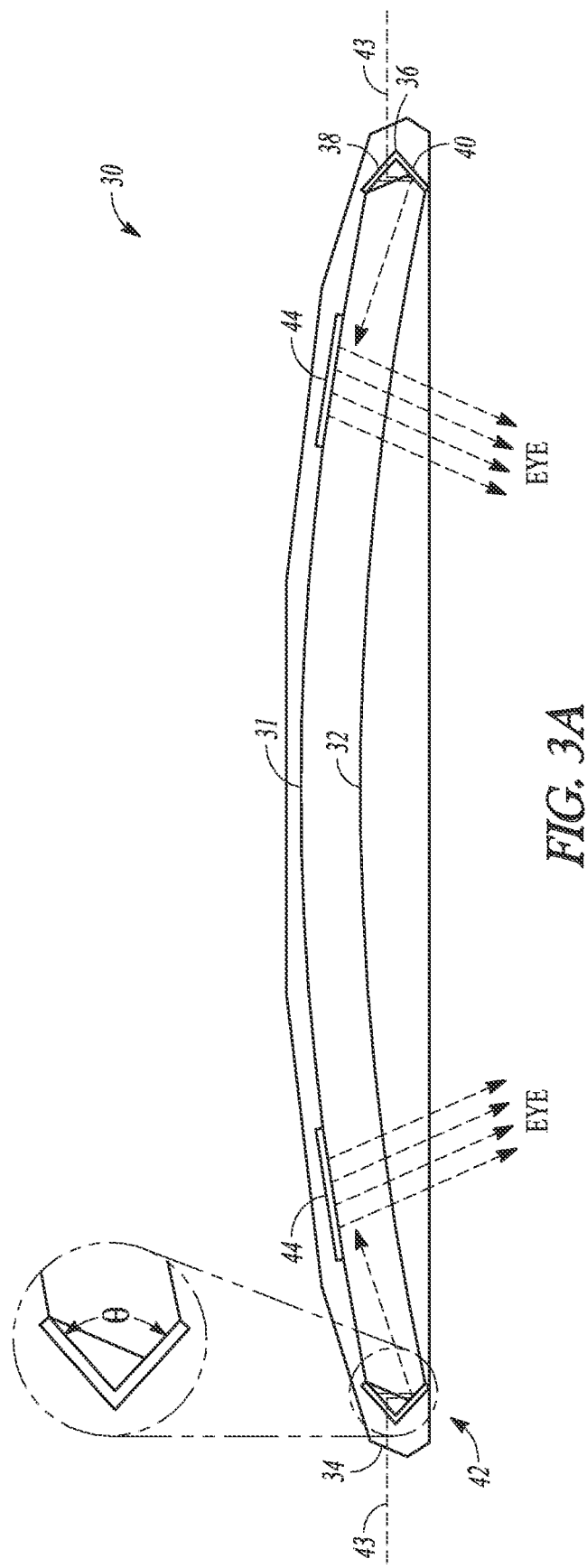
FIG. 3A is a cross-sectional view of a waveguide that can be used with a NED system, such as the example of FIG. 2.

Referring to FIG. 3A, a first example of a curved waveguide 30 is shown. As can be appreciated, waveguide 30 can be substituted for waveguide 10 in the NED system of FIG. 1, which is explained in more detail below.

Figure 3C:
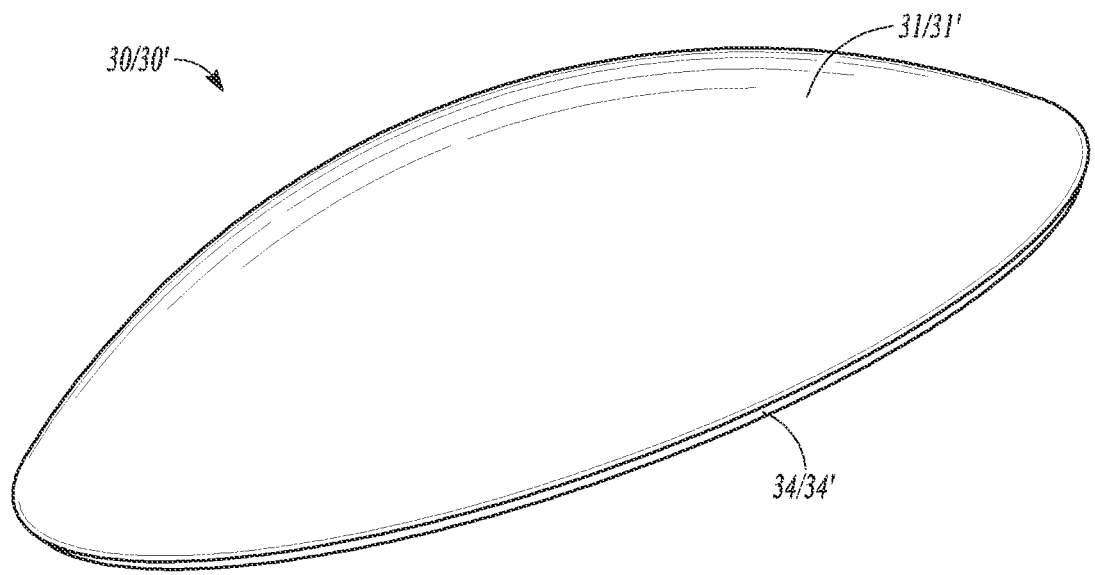
FIGS. 3C-3D are top and bottom perspective views, respectively, of the waveguides of FIGS. 2A-B.
Figure 3D:
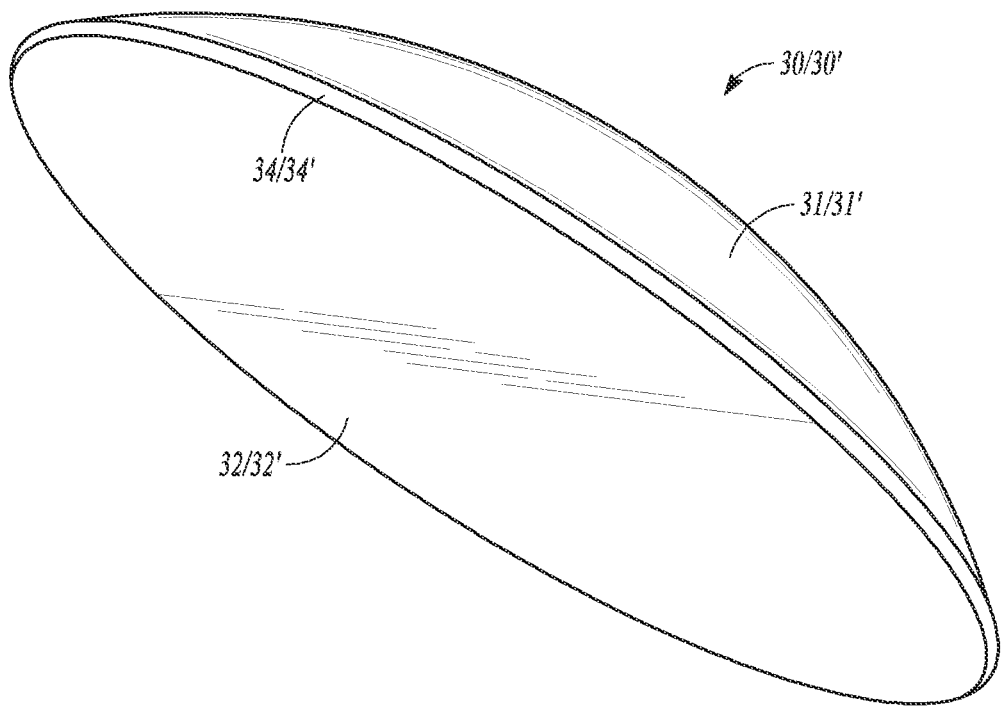

Waveguide 30 can have a shape similar to a traditional eye lens (e.g., as used in a pair of consumer glasses), for example as shown in FIGS. 3C-D. In other words, waveguide 30 can be used with a NED in the shape of traditional consumer glasses, similar to NED 100 of FIG. 2. Thus, waveguide 30 can have top and bottom surfaces 31, 32, which can be curved, and a perimeter 34 that can be circular, elliptical, or another shape typical of an eye lens. In an example, waveguide 30 can have a perimeter 34, and top and bottom surfaces 31, 32 can be continuously curved from a first point along perimeter 34 to a second, opposite point along perimeter 34, in a plurality of different directions. Stated differently, top and bottom surfaces 31, 32 can be curved to form a partial-dome structure for waveguide 10.

As shown in FIG. 3A, perimeter 34 of waveguide 30 can form an angled edge 36 (e.g., a substantially V-shaped edge). Angled edge 36 can have a first surface 38 and a second surface 40, which can intersect at an angle θ of anywhere between about 0-90°. An edge 36 apex can be formed at the intersection of the first and second surfaces 38, 40. Angled edge 36 can extend around an entirety of perimeter 34 of waveguide 30, as shown in FIGS. 3A and 3C-D, which can allow waveguide 10 to accept light (e.g., a projected image) from many different rotational positions along perimeter 34. Alternatively, angled edge 36 can extend around only part of perimeter 34 of waveguide 30, it can extend along perimeter 34 of waveguide 30 in successive spaced-apart segments, it can extend along a majority of perimeter 34 of waveguide 30, or it can extend along a minority of perimeter 34 of waveguide 30. In an example, angled edge 36 can be designed to interface with a portion of frame 106 of NED 100 to retain waveguide 30 within frame 106. For instance, a portion of frame 106 of NED 100 that holds each eye lens (e.g., waveguide 30) can include a slot sized and shaped to receive angled edge 36 of waveguide 30 and retain waveguide 30 in frame 106. Such a frame part can be lens rim 115. As such, lens rim 115 can include a slot that interfaces with angled edge 36 of waveguide 30 to retain waveguide 30 in frame 106. Of course, frame 106 can include a lens rim 115 for each eye and each waveguide 30 of NED 100. Each lens rim 115 can therefore include the above-described slot that can interface with angled edge 36 of each respective waveguide 30. In an example, the slot can be angled to match the angle of angled edge 36 so that angled edge 36 can be received in the slot.

Angled edge 36 of waveguide 30 (e.g., first and/or second surfaces 38, 40) can also include surface gratings (not visible) configured to diffract light as it enters waveguide 30. An example of surface gratings 50 that can be used are shown in close-up in FIG. 4. It is to be understood that a variety of different surface grating patterns can be used with the examples of the disclosure, and that surface gratings 50 are but a single example. A diffraction grating is a type of Diffractive Optical Element (DOE), which can have a series of very fine linear structures with a period/repeated spacing on the order of wavelengths of light. A diffraction grating can act as a lens or prism to bend light, and as a side effect the light can also be split and separated by wavelength. Surface gratings 50 can constitute a diffraction grating, which as shown can have repeated linear structures 52 separated by very small distances—e.g., on the order of wavelengths of light. As illustrated, linear structures 52 can be angled to direct light in a desired direction. Such an effect is shown, for example, in FIG. 1 where it can be seen that in-coupling region 21 can redirect light beam(s) 18 as beam(s) 18 enters waveguide 10.

Surface gratings (not visible) can extend along part or all of angled edge 36 of waveguide 30, such that angled edge 36 of waveguide 30 can act as in-coupling region 42 for light 43 entering waveguide 30. As shown in FIG. 3A, waveguide 30 can also include an exit region 44, which can have surface gratings (not visible) for redirecting light 43 exiting waveguide 30. In an example, the surface gratings (not visible) can have the same structure and design as surface gratings 50 of FIG. 4, although other surface gratings are possible, as disclosed herein. Exit region 44 of waveguide 30 can be formed as a continuous ring of surface gratings (not visible) extending around top surface 31 of waveguide 30. In other examples, exit region 44 of waveguide 30 can correspond to the location(s) of in-coupling region 42 along angled edge 36 of perimeter 34. In other words, exit region 44 can extend around only part of top surface 31 of waveguide 30, it can extend along top surface 31 of waveguide 30 in successive spaced-apart segments, it can extend along a majority of top surface 31 of waveguide 30, or it can extend along a minority of top surface 31 of waveguide 30, all at locations corresponding to the position of in-coupling region 42 along angled edge 36 of perimeter 34. By locations corresponding to the position of in-coupling region 42, it is meant that exit region 44 of waveguide 10 can be positioned at locations on top surface 31 wherein light 43 refracted or reflected from in-coupling region 42 can contact exit region 44 and its surface gratings (not visible). In other words, exit region 44 can act as a target region for light 43 refracted or reflected from in-coupling region 42, whether or not exit region 44 is configured as a continuous exit region 44, spaced-apart segments, etc. By target region, it is meant that in-coupling region 42, whatever its form, can redirect light 43 to a corresponding exit region 44, in the form of a target region, which can then redirect light 43 towards the user to project an image to the user.

Referring to FIG. 3A, in-coupling region 42 and exit region 44 can be formed with surface gratings (not visible), such that light 43 travelling through in-coupling region 42 can be diffracted towards exit region 44, and then such light 43 can be diffracted by way of exit region 44 towards a user's eye to project an image to the user. In a particular example, light 43 can initially travel through first surface 38 of in-coupling region 42 and be diffracted towards second surface 40 of in-coupling region 42 by way of surface gratings (not visible) formed on first surface 38. Then, as shown in FIG. 3A, light 43 can come into contact with second surface 40 of in-coupling region 42 and be diffracted towards exit region 44 by way of surface gratings (not visible) formed on second surface 40. As light 43 comes into contact with exit region 44, it can finally be diffracted once more towards a user's eye by way of surface gratings (not visible) formed in exit region 44 to project an image or part of an image to the user. As can be appreciated, FIG. 3A depicts a single waveguide 30, but multiple waveguides 30 can be combined with other components (e.g., optical engine 12 or multiple optical engines 12) to form a NED with a waveguide 30 for each eye of the user. An example of such a NED is NED 100 of FIG. 2. With the unique construction and positioning of in-coupling region 42 and exit region 44 of each waveguide 30, as disclosed herein, such a NED can therefore more closely fit the expectations of traditional users in terms of form factor.

To provide further disclosure, NED 100 can incorporate waveguide 30 into or as its lenses 112. In addition, NED 100 can include an optical engine 12 in one or both of its end pieces 121, as detailed previously. Optical engine(s) 12 can project light 43 through frame 106 (e.g., through a transparent part of frame 106, through an opening(s) in frame 106, or through another light-transmitting mechanism in frame 106) and into waveguide 30. Then, as detailed above, light 43 can be refracted and/or reflected by way of in-coupling region 42 of waveguide 30, and redirected towards the user by exit region 44 to project an image(s) to the user. Further, battery 127, computer 124, and the other components of NED 100 can support the transmission of light by optical engine 12, and be coupled to optical engine 12 for purposes thereof. As such, NED 100 can present a NED that more closely approximates traditional expectations of eyewear, and can utilize a unique waveguide 30 to do so.

An example of an alternative waveguide 30' is shown in FIG. 3B. Here, like reference numerals refer to like elements, except that a prime designation is used for waveguide 30'. In addition, only the distinctions between waveguides 30, 30' are discussed below, it being understood that waveguide 30' can have any of the features or characteristics of waveguide 30, except as disclosed below.

Referring to FIG. 3B, waveguide 30' can be designed similarly to waveguide 30, except that waveguide 30' can have a different exit region 44'. As shown, exit region 44', which can comprise surface gratings (e.g., surface gratings 50), can be positioned as a disc in the center of waveguide 30'. As light 43' strikes angled edge 36', it can be diffracted and redirected towards exit region 44', which can then diffract light 43' towards a user's eye to project an image to the user. In a particular example, as shown in FIG. 2B, light 43' can strike second surface 40' of angled edge 36', be diffracted by surface gratings (not visible) on second surface 40' towards first surface 38', be diffracted by surface gratings (not visible) on first surface 38' towards exit region 44', and finally be diffracted by surface gratings (not visible) within exit region 44' towards a user's eye to project an image to the user. As such, waveguide 30' can provide a unique construction and positioning of in-coupling region 42' and exit region 44', which, when used in a NED, can more closely fit the expectations of traditional users in terms of form factor for the NED. Indeed, waveguide 30' can more closely replicate the traditional form factor of an eye lens in normal eyewear. Particularly, angled edge 36' of waveguide 30' can be used as an in-coupling region 42', which can also interface with frame 106 of NED 100, in the manner described previously. Such a construction for NED 100 allows for an improved form factor and use of waveguide 30' as compared to existing NEDs. Indeed, waveguide 30' can be utilized with NED 100 of FIG. 2 much in the same way that waveguide 30 is utilized, as described above.

Although not shown, even other examples of a curved waveguide similar to waveguides 30, 30' is contemplated by the disclosure. As an example, an alternative to waveguides 30, 30' might encompass a waveguide with the same construction as either of waveguides 30, 30', except that an exit region of the waveguide could cover an entirety of the top surface of such a waveguide. In this alternative example, the waveguide, due to the large exit region, can present a larger field of view coverage as compared to the aforementioned waveguides 30, 30'.

Further, although not discussed above, it is contemplated that surface gratings 50 or any of the other surface gratings disclosed herein can utilize a reflective coating, as necessary, to ensure that light is redirected as appropriate through waveguides 10, 30, 30'.

Figure 5:
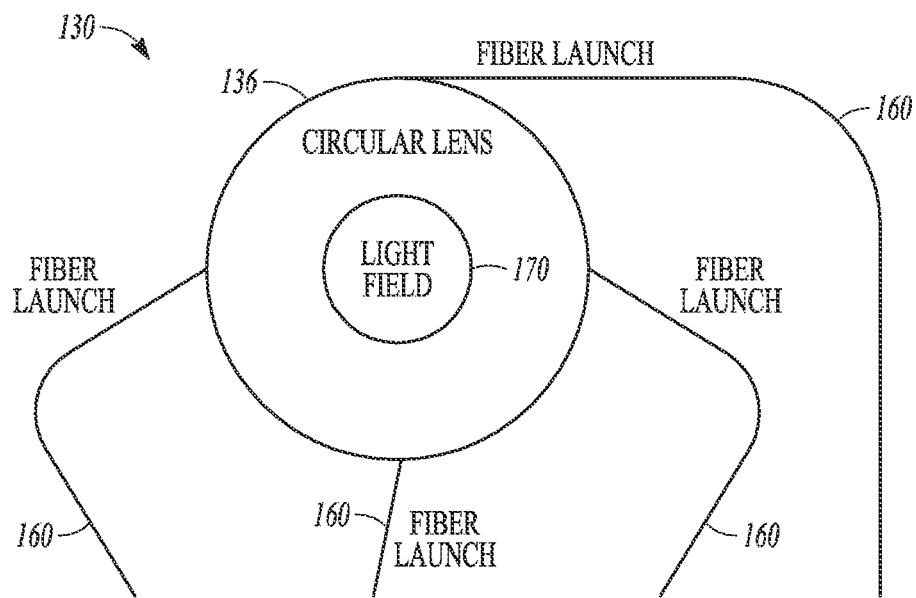
FIG. 5 is a schematic view of a third waveguide that can be used with a NED system, such as the system disclosed herein.
Figure 6:
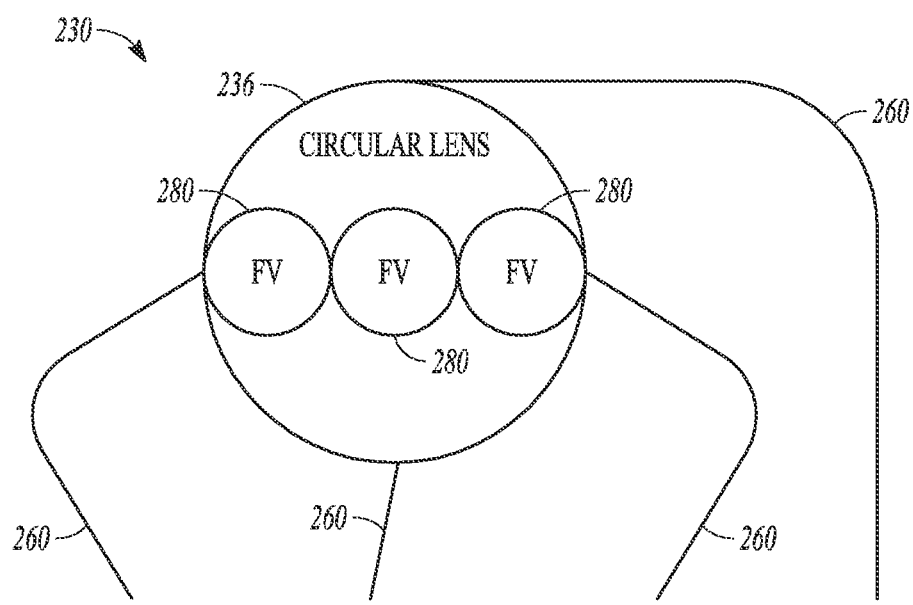
FIG. 6 is a schematic view of a fourth waveguide that can be used with a NED system, such as the system disclosed herein.

Additional examples of alternate waveguides 130, 230 are shown in FIGS. 5-6. FIG. 5 demonstrates that a waveguide 130 can be provided, which can constitute a substantially circular lens, in an embodiment. In addition, waveguide 130 can include one or more (e.g., a plurality) of fiber launches 160 configured to emit light into waveguide 130. Fiber launches 160, as shown, can be positioned about a circumference of waveguide 130 and be arranged to emit light into waveguide 130 towards a light field 170. In an example, light field 170 can comprise surface gratings (not shown) having similar characteristics to the gratings described previously, or other characteristics. Fiber launches 160 can project light into waveguide 130 in any combination, or all together simultaneously. In other words, it is contemplated that a first of fiber launches 160 can project light into waveguide 130 from a first position along the circumference of waveguide 130, a second of fiber launches 160 can project light into waveguide 130 from a second position along the circumference of waveguide 130 at the same or a different time, a third of fiber launches 160 can project light into waveguide 130 from a third position along the circumference of waveguide 130 at the same or a different time, etc., in any combination. Merely as an example, one combination could be the first and third fiber launches 160 projecting light into waveguide 130 at the same time and then the second fiber launch 160 projecting light into waveguide 130 at a different time. In short, any combination is possible with fiber launches 160 to project light into waveguide 130 along its circumference. Further, it is also contemplated that waveguide 130 can include an angled edge 136 with the same configuration and function as angled edges 36, 36' of the prior embodiments, such that light projected from fiber launches 160 can travel through angled edge 136 at the circumference of waveguide 130 and be diffracted and/or reflected by edge 136, in the manner described previously.

FIG. 6 illustrates yet another waveguide 230 that can constitute a substantially circular lens, in an embodiment. Further, like waveguide 130, waveguide 230 can utilize one or more (e.g., a plurality) of fiber launches 260. Fiber launches 260 can be of the same construction and used in the same manner as fiber launches 160 described above. In addition, waveguide 230 can also include an angled edge 236, similar to angled edges 136, 36, 36' described previously Thus, fiber launches 260 can project light into waveguide 230 along its circumference through angled edge 236, in a manner similar to waveguides 30, 30', 130 described above. Waveguide 230, however, can also include a set of distinct surface area (e.g., diffraction) gratings 280, as shown in FIG. 6. Surface area gratings 280 can be circular, rectangular, polygonal, oval, or another distinct shape. In an example, each surface area grating 280 can be distinct and separate from another of the surface area gratings 280. In use, as described previously, fiber launches 260 can project light into waveguide 230 towards surface area gratings 280 to project an image to a user. In an example, a particular fiber launch 260 can be directed towards a particular one of surface area gratings 280 to assist with image projection. In a further example, fiber launches 260 can project light at the same or different times individually to each of the surface area gratings 280 for image-projection purposes. As such, as described previously, any combination of fiber launches 260 can be used at the same or at different times to project light, individually or in series, to one or more of surface area gratings 280 so as to project an image to a user.

It will be readily understood to those skilled in the art that various other changes in the details, material, and arrangements of the parts and method stages which have been described and illustrated in order to explain the nature of the inventive subject matter can be made without departing from the principles and scope of the inventive subject matter as expressed in the subjoined claims. For example, the order of method steps or stages can be altered from that described above, as would be appreciated by a person of skill in the art.

It will also be appreciated that the various dependent claims, examples, and the features set forth therein can be combined in different ways than presented above and/or in the initial claims. For instance, any feature(s) from the above examples can be shared with others of the described examples, and/or a feature(s) from a particular dependent claim may be shared with another dependent or independent claim, in combinations that would be understood by a person of skill in the art.

SUMMARY

From the above description, a non-limiting list of examples can include:

Example 1 includes a waveguide for a display system comprising a waveguide body configured to guide light through the waveguide body, the waveguide body comprising a pair of opposite major outer faces, and a peripheral edge face connecting the major outer faces, a light in-coupling region formed on the peripheral edge face of the waveguide body, the light in-coupling region including a first surface having a first set of diffraction gratings and a second surface having a second set of diffraction gratings, the first and second surfaces being angled relative to each other, and a light exit region formed along a top surface of the waveguide body, the light exit region including a third set of diffraction gratings, wherein the first set of diffraction gratings are configured to diffract light towards the second set of diffraction gratings, the second set of diffraction gratings are configured to diffract light towards the third set of diffraction gratings, and the third set of diffraction gratings are configured to diffract light towards a user's eye.

Example 2 includes the waveguide of Example 1, wherein the first and second surfaces are angled relative to each other by anywhere between about 10-90°.

Example 3 includes the waveguide of any one of or any combination of Examples 1-2, wherein the light in-coupling region, including the first and second sets of diffraction gratings, extends along an entirety of the edge of the waveguide body.

Example 4 includes the waveguide of any one of or any combination of Examples 1-3, wherein the light in-coupling region, including the first and second sets of diffraction gratings, extends along only part of the peripheral edge face of the waveguide body.

Example 5 includes the waveguide of any one of or any combination of Examples 1-4, wherein the light exit region, including the third set of diffraction gratings, are formed along a majority of the top surface of the waveguide body.

Example 6 includes the waveguide of any one of or any combination of Examples 1-5, wherein the light exit region, including the third set of diffraction gratings, forms a continuous ring on the top surface of the waveguide body.

Example 7 includes the waveguide of any one of or any combination of Examples 1-6, wherein the peripheral edge face of the waveguide body is substantially V-shaped.

Example 8 includes an image display system comprising an optical engine configured to generate an image, and a waveguide. The waveguide comprises front and rear surfaces, the waveguide arranged and configured to guide light from the optical engine through the waveguide by reflection at the front and rear surfaces to guide the light onto an eye of a user and project the image to the user, a pair of opposite major outer faces, and a peripheral edge face connecting the major outer faces, a light in-coupling region formed along the peripheral edge face, the light in-coupling region including a first surface with a first set of diffraction gratings, and a light exit region formed along a top surface of the waveguide, the light exit region including a second set of diffraction gratings, wherein the first set of diffraction gratings are configured to diffract light towards the second set of diffraction gratings, and the second set of diffraction gratings are configured to diffract light towards the user's eye.

Example 9 includes the image display system of Example 8, wherein the light in-coupling region further comprises a third surface with a third set of diffraction gratings, wherein the first surface is angled relative to the second surface.

Example 10 includes the image display system of Example 9, wherein the first and second surfaces are angled relative to each other by anywhere between about 10-90°.

Example 11 includes the image display system of any one of or any combination of Examples 8-10, wherein the light in-coupling region, including the first set of diffraction gratings, extends along an entirety of the peripheral edge face of the waveguide.

Example 12 includes the image display system of any one of or any combination of Examples 8-11, wherein the light in-coupling region, including the first set of diffraction gratings, extends along only part of the peripheral edge face of the waveguide.

Example 13 includes the image display system of any one of or any combination of Examples 8-12, further comprising a frame including a waveguide rim, the waveguide rim including an inner edge that receives the edge of the waveguide and fixedly retains the waveguide within the frame.

Example 14 includes the image display system of Example 13, wherein the inner edge of the frame comprises an angled slot configured to receive the peripheral edge face of the waveguide.

Example 15 includes the image display system of Example 13, further comprising at least a first light-transmission region in the waveguide rim for receiving the image from the optical engine and allowing the image to enter the waveguide through the waveguide's light in-coupling region.

Example 16 includes a method of projecting an image to a user comprising projecting light representative of an image from an optical engine, directing the light representative of the image to a light in-coupling region of a waveguide, the waveguide comprising a pair of opposite major outer faces, and a peripheral edge face connecting the major outer faces, wherein the light in-coupling region is formed along the peripheral edge face of the waveguide, the light in-coupling region including a first surface with a first set of diffraction gratings, by way of the first set of diffraction gratings, redirecting the light representative of the image towards an exit region of the waveguide, the exit region comprising a second set of diffraction gratings, and by way of the second set of diffraction gratings, redirecting the light representative of the image towards an eye of the user to project the image to the user.

Example 17 includes the method of Example 16, wherein the light in-coupling region includes a second surface with a third set of diffraction gratings, and the method further comprises, by way of the third set of diffraction gratings, redirecting the light representative of the image towards the first set of diffraction gratings.

Example 18 includes the method of any one of or any combination of Examples 16-17, further comprising directing the light representative of the image through a frame of a near-eye display system and to the light in-coupling region.

Example 19 includes the method of Example 18, wherein the frame comprises a waveguide rim, the waveguide rim including an inner edge that receives the edge of the waveguide and fixedly retains the waveguide within the frame.

Example 20 includes the method of any one of or any combination of Examples 17-19, wherein the first and second surfaces are angled relative to each other by anywhere between about 10-90°.

What is claimed is:

1. A waveguide for a display system comprising: a waveguide body configured to guide light through the waveguide body, the waveguide body comprising a pair of opposite major outer faces, and a peripheral edge face connecting the major outer faces; a light in-coupling region formed on the peripheral edge face of the waveguide body, the light in-coupling region including a first surface having a first set of diffraction gratings and a second surface having a second set of diffraction gratings, the first and second surfaces being angled relative to each other and wherein the light in-coupling region, including the first and second sets of diffraction gratings, extends along an entirety of the peripheral edge face of the waveguide body; and a light exit region formed along a top surface of the waveguide body, the light exit region including a third set of diffraction gratings, wherein the first set of diffraction gratings are configured to diffract light towards the second set of diffraction gratings, the second set of diffraction gratings are configured to diffract light towards the third set of diffraction gratings, and the third set of diffraction gratings are configured to diffract light towards an eye of a user.

2. The waveguide of claim 1, wherein the light exit region, including the third set of diffraction gratings, are formed along a majority of the top surface of the waveguide body.

3. The waveguide of claim 1, wherein the light exit region, including the third set of diffraction gratings, forms a continuous ring on the top surface of the waveguide body.

4. The waveguide of claim 1, wherein the peripheral edge face of the waveguide body is substantially V-shaped.

5. The waveguide of claim 1, comprising a plurality of fiber launches located at respective positions on the peripheral edge face of the waveguide to emit light into the waveguide.

6. The waveguide of claim 1, comprising a plurality of surface area diffraction gratings.

7. The waveguide of claim 6, wherein individual surface area diffraction gratings of the plurality of surface area diffraction gratings are distinct and separate from each of the other individual surface area diffraction gratings of the plurality of surface area diffraction gratings.

8. An image display system comprising:
an optical engine configured to generate an image; and
a waveguide comprising:
front and rear surfaces, the waveguide arranged and configured to guide light from the optical engine through the waveguide by reflection at the front and rear surfaces to guide the light onto an eye of a user and project the image to the user;
a pair of opposite major outer faces, and a peripheral edge face connecting the major outer faces;
a light in-coupling region formed along an entirety of the peripheral edge face, the light in-coupling region including a first surface with a first set of diffraction gratings; and
a light exit region formed along a top surface of the waveguide, the light exit region including a second set of diffraction gratings, wherein the first set of diffraction gratings are configured to diffract light towards the second set of diffraction gratings, and the second set of diffraction gratings are configured to diffract light towards an eye of the user.

9. The image display system of claim 8, wherein the light in-coupling region further comprises a second surface with a third set of diffraction gratings, wherein the first surface is angled relative to the second surface.

10. The image display system of claim 8, wherein the light exit region, including the second set of diffraction gratings, are formed along a majority of the top surface of the waveguide.

11. The image display system of claim 8, comprising a frame including a waveguide rim, the waveguide rim including an inner edge that directly receives the edge of the waveguide and fixedly retains the waveguide within the frame.

12. The image display system of claim 11, wherein the inner edge of the frame comprises an angled slot configured to receive the peripheral edge face of the waveguide.

13. The image display system of claim 11, comprising at least a first light-transmission region in the waveguide rim for receiving the image from the optical engine and allowing the image to enter the waveguide through the light in-coupling region.

14. The image display system of claim 8, comprising:
a frame including:
first end piece defining a first lateral end portion of the frame;
a second end piece defining a second lateral end portion of the frame;
a first temple having a first front portion coupled to the first end piece and a first rear portion configured to engage a first ear of the user;
a second temple having a second front portion coupled to the second end piece and a second rear portion configured to engage a second ear of the user.

15. The image display system of claim 14, wherein the optical engine is disposed within at least one of the first end piece or the second end piece.

16. A waveguide for a display system comprising: a waveguide body configured to guide light through the waveguide body, the waveguide body comprising a pair of opposite major outer faces, and an angled peripheral edge face connecting the major outer faces, the angled peripheral edge face including a first surface and a second surface that intersect at an angle relative to each other; a light in-coupling region formed on the peripheral edge face of the waveguide body, the light in-coupling region including a first set of diffraction gratings disposed on the first surface of the angled peripheral edge face and a second set of diffraction gratings disposed on the second surface of the angled peripheral edge face; and a light exit region formed along a top surface of the waveguide body, the light exit region including a third set of diffraction gratings that is formed along a majority of the top surface of the waveguide body, wherein the first set of diffraction gratings are configured to diffract light towards the second set of diffraction gratings, the second set of diffraction gratings are configured to diffract light towards the third set of diffraction gratings, and the third set of diffraction gratings are configured to diffract light towards an eye of a user.

17. The waveguide of claim 16, wherein the light exit region, including the third set of diffraction gratings, are formed along a majority of the top surface of the waveguide body.

18. The waveguide of claim 16, comprising:
a plurality of fiber launches located at respective positions on the angled peripheral edge face of the waveguide to emit light into the waveguide; and
a plurality of surface area diffraction gratings.

19. The waveguide of claim 18, wherein at least one fiber launch of the plurality of fiber launches projects light toward at least one surface area grating of the plurality of surface area diffraction gratings to project an image to the user.

20. The waveguide of claim 18, wherein a first fiber launch of the plurality of fiber launches projects light to a first surface area diffraction grating of the plurality of surface area diffraction gratings at a first time that is different from a second time that a second fiber launch of the plurality of fiber launches projects light to a second surface area diffraction grating of the plurality of surface area diffraction gratings.

* * * * *